United States Patent
Baginski

[11] 3,800,623
[45] Apr. 2, 1974

[54] BICYCLE PEDAL
[75] Inventor: Martin R. Baginski, Austinburg Twp., Ashtabula Cty., Ohio
[73] Assignee: Ashtabula Bow Socket Company, Ashtabula, Ohio
[22] Filed: May 1, 1972
[21] Appl. No.: 249,368

[52] U.S. Cl. .............................................. 74/594.4
[51] Int. Cl. ............................................. B62m 3/12
[58] Field of Search .................................. 74/594.4

[56] References Cited
FOREIGN PATENTS OR APPLICATIONS
| | | | |
|---|---|---|---|
| 228,807 | 12/1943 | Switzerland | 74/594.4 |
| 1,109,172 | 1/1956 | France | 74/594.4 |
| 1,236,493 | 6/1960 | France | 74/594.4 |

*Primary Examiner*—Benjamin W. Wyche
*Assistant Examiner*—F. D. Shoemaker

[57] ABSTRACT

A reflectorized bicycle pedal includes a pedal axle, a pedal body and bearing means which support the pedal body for rotation relative to the pedal axle. The pedal body is defined by a plurality of members and has an inboard and an outboard end. The frame member of the pedal body has an outboard end portion which defines a portion of the outboard end of the pedal body and has an opening therein. The pedal body further includes a reflector which is visible through the opening in the outboard end portion of the frame member and is also protected from damage by the frame member. The reflector is positioned between two pedal body members and is supported by at least one pedal body member by sealing the reflective facets of the reflector to one of the pedal body members to prevent exposure of the surface of the reflector to foreign matter.

12 Claims, 12 Drawing Figures

BICYCLE PEDAL

The present invention relates to a reflectorized bicycle pedal and more particularly to a reflectorized bicycle pedal having a reflector visible from the outboard end thereof.

Safety bicycle pedals having separate reflectors mounted on the outboard end thereof are known. One such prior art design has provided a pedal utilizing adhesives to retain the reflector on the outboard end of a pedal. Other prior art pedals have retained a reflector in a depression in one of the pedal members by means of friction or adhesives as shown in Penny et. al., U.S. Pat. No. 2,151,144, German Pat. No. 1,140,096, Netherland Pat. No. 91,592 and French Pat. No. 1,313,013. These pedal reflectors of the prior art have included injection molded reflectors having reflective facets on one side thereof to reflect the light as well known to those skilled in the art.

Bicycle pedals which have the reflector mounted in the outboard end thereof are effective safety devices which warn motorists of the presence of the bicyclist when approaching a bicycle having reflectorized pedals. More particularly, relfectors mounted on the outboard end of the pedal are visible from the side of the bicycle. Thus, in the night-time, when a bicyclist going across an intersection and a motorist is approaching that intersection at an angle to the path of the bicycle, the lights of the motorist's vehicle will impinge on the outboard reflector. Due to the motion of the bicycle pedal, the reflector will reflect a flashing signal of light from the outboard side of the pedal to alert the motorist of the bicyclist's presence. The flashing nature of the reflected signal is extremely important since it quickly attracts the motorist's attention.

When a bicycle pedal has a reflector mounted in the outboard end thereof, the reflector is highly susceptible to damage or breakage from impact by the other articles. The prior art has not provided such protection for the reflectors, but in fact has provided designs which allow the reflectors to be easily broken.

Bicycle pedals are generally exposed to the elements and do become contaminated with water, dust, dirt and other foreign materials. When these foreign materials contact the reflective facets on a reflector mounted on the outboard end of the pedal, the reflective properties of the reflector are substantially decreased and the effectiveness of the reflector is impaired. The prior art pedals have not provided means for effectively excluding contaminants from the facets of the reflector mounted on the outboard end of the pedal to thereby maintain the reflector in an operative and effective condition.

The methods by which the prior art pedals secure the reflectors to the outboard ends thereof allows contaminants to come into contact with the facets on the reflector, and also allows the reflector to be broken upon impact since no means are provided to protect the reflector.

In addition, the securing means of the prior art pedals allow the reflector to become disassociated with the pedal. For example, when certain adhesives are used to secure the pedal to the pedal body, the adhesive ages and allows the reflector to fall out of the pedal whereupon the pedal losses its reflective safety characteristics. When the reflectors are retained in the pedal by means of friction, impact forces on the reflector, in either direction, will disengage the reflector from the part of the pedal which holds it. In either case, use of the pedal will allow shifting of the reflector and the pedal member to which it is attached and thereby decrease the effectiveness of means which secure the reflector to the pedal and the reflector will eventually become disengaged with the pedal.

The reflectorized bicycle pedal of the present invention provides a design wherein the reflector is an integral part of the pedal body and includes a pedal axle, a pedal body and bearing means for rotatably supporting the pedal body on the pedal axle. The pedal body has a plurality of members which are operatively connected with a frame member of the pedal body which has an outboard end portion defining a portion of the outboard end of the pedal body. The outboard end portion of the frame member has an opening therein. The pedal includes a reflector which is mounted inboard of the outboard end portion of the frame so that it is protected by the frame member. Means are provided for supporting a reflector in alignment with the opening in the frame and for sealing the facets on the refelctor to prevent exposure thereof to foreign matter.

The present invention contemplates a reflector which is an integral part of the pedal. The bicycle pedal of the present invention secures the reflector so that it is visible from the outboard end of the pedal by sealing the reflector to one of the operative pedal members, such as a bearing member or one of the pedal members associated therewith. The present invention alternatively retains the outboard reflector in the bicycle pedal by positioning the reflector between two parts of the bicycle pedal and retains the reflector therebetween by compressive forces between the two parts of the pedal. One of the parts of the pedal body cooperate with a bearing member of the pedal body and is an integral part of the pedal body. Such a bicycle pedal rigidly secures the reflector to the pedal to retain the reflector as an integral part of the pedal.

Such a reflectorized safety pedal of the present invention provides a design which eliminates contamination of the reflector facets of the outboard reflector to maintain high quality reflective properties, protects the reflector from impact forces, and eliminates the possibility of the reflector from becoming disengaged with the bicycle pedal.

This advantageous design provides a reflectorized bicycle pedal which clearly indicates a cyclist's presence. For example, if a motorist is approaching the path of a cyclist utilizing the reflectorized pedal of the immediate invention, his headlights will strike the outboard reflector and he will see a flashing signal due to the motion of the pedals. The color of the reflector will act to enhance the warning nature of the flashing signal and may be any of a number of colors, such as amber or red.

Accordingly, it is an object of the present invention to provide a new and improved bicycle pedal having a reflector visible from the outboard end thereof which provides a new and novel method of securing a reflector to the outboard end of a bicycle pedal.

It is a further object of the present invention to provide a new and improved bicycle pedal having a reflector visible from the outboard end thereof which is constructed to eliminate contamination of the reflector in the outboard end thereof.

It is another object of this invention to provide a new and improved bicycle pedal having a reflector visible from the outboard end thereof which protects the reflector from impact forces thereon.

A further object of the present invention is to provide a new and improved bicycle pedal having a reflector visible from the outboard end thereof which includes a pedal body rotatable about a pedal axle, which pedal body includes a frame member having an outboard portion with an opening therein through which the reflector is visible therethrough.

It is yet another object of the present invention to provide a new and improved bicycle pedal having a reflector visible from the outboard end thereof which is constructed to retain the reflector in the outboard end of the pedal by positioning the reflector between two members of the pedal body and sealing the reflector against one of those members.

A further object of the present invention is to provide a new and improved bicycle pedal having a reflector visible from the outboard end thereof which is constructed to retain the reflector in the outboard end of the pedal by sealing complimentary sealing faces on the reflector and one of the pedal members.

Still further objects, advantages, features of the present invention will be apparent to those skilled in the art to which it relates from the following detailed description made with reference to the accompanying drawings forming a part of the specification and in which:

The present invention provides a reflectorized bicycle pedal having a reflector visible from the outboard end thereof. The bicycle pedal of the present invention includes a pedal body having a frame member. The frame member has an outboard end portion having an opening therein. The reflector is mounted behind the opening in the frame member and is visible therethrough. The reflector is retained in the pedal body so as to prevent contamination of the reflective facets of the reflector by foreign matter. The reflector is visible through the opening in the frame member and is protected from impact forces thereby. When the outboard end of a bicycle pedal is rendered reflective in this manner a clear indication of a cyclist's presence on a bicycle having such reflectorized pedals will be provided.

Figure 1:
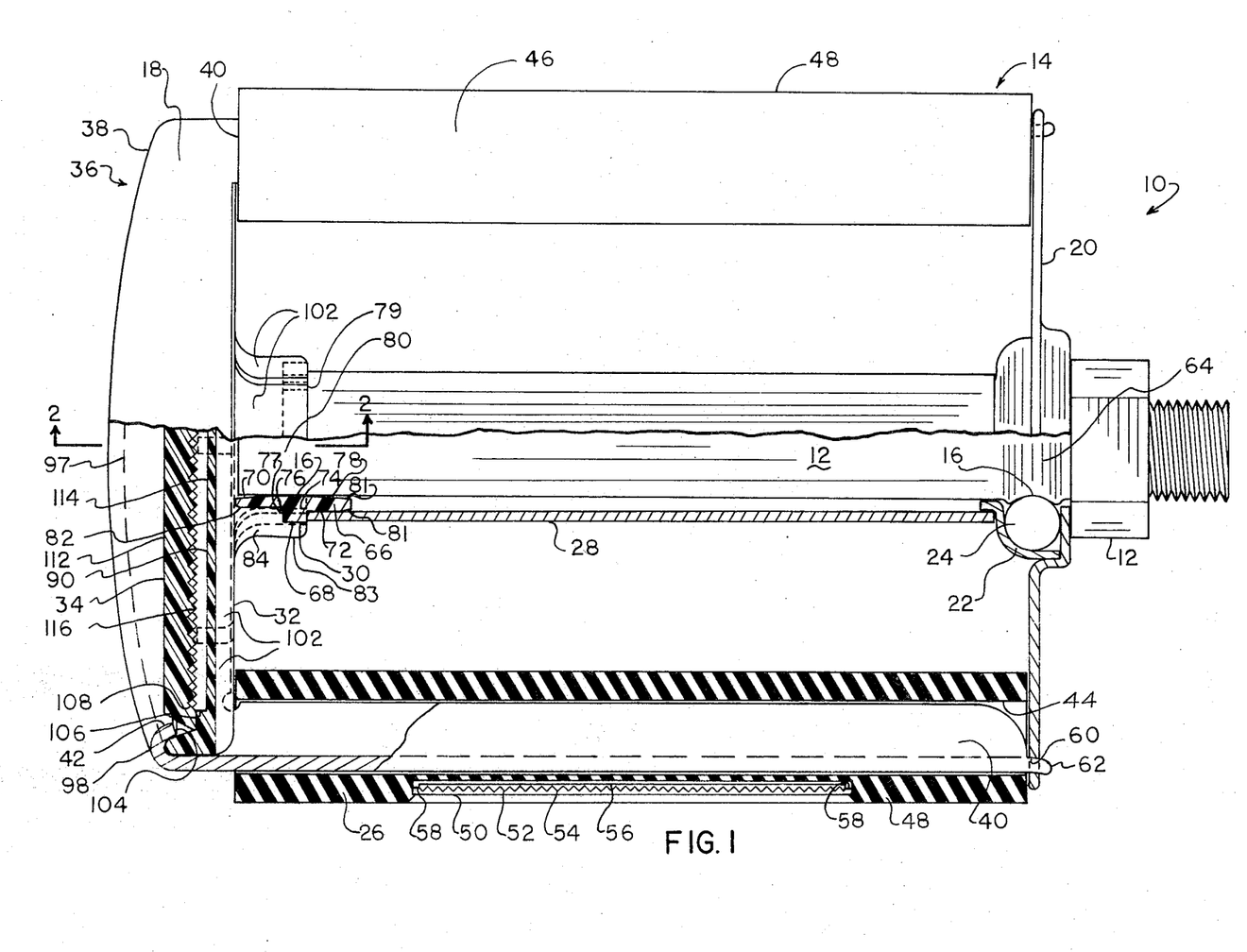
FIG. 1 is a side elevational view of a reflectorized bicycle pedal, a portion of which is shown in cut-away section.

FIG. 1 shows a representative bicycle pedal 10 embodying the present invention. The bicycle pedal 10 includes a pedal axle 12, a pedal body 14 and bearing means 16 rotatably supporting the pedal body 14 relative to the pedal axle 12.

The pedal body 14 includes a tread supporting frame member 18, tread members 26, an end brace 20, a ball cup 22, ball bearings 24, a tube member 28, and bearing member 30, a bearing and reflector retainer member 32 and a reflector 34. The reflector 34 is visible from the outboard end 36 of the pedal 10 so as to provide a clear indication of a cyclist's presence on a bicycle having the pedals of the present invention. These parts are operatively innerconnected as will be hereinafter described to rotate as an integral pedal body 14 about the pedal axle 12.

The tread supporting frame member 18 of the pedal body 14 of the present invention is provided to support the treads 26, protect the reflector 34 and transmit the necessary compressive forces through the members of the central portion of the pedal body to provide an integral pedal body 18. The frame member 18 has a generally U-shaped configuration defined by an outboard end portion. The outboard end portion 38 has an opening 42 therein, through which the reflector 34 is visible as will be hereinafter more clearly described.

The tread supporting portions 40 of the frame member 18 have a generally channel-like configuration and are adapted to be received by openings 44 in the pedal treads 26. The openings 44 have a shape complimentary to the channel shape of the tread supporting portion 40. The treads 26 have upper and lower surfaces 46 which are adapted to be engaged by a bicycle rider's foot. These upper and lower surfaces 46 may have any one of a number of geometric configurations for providing an anti-slip surface thereon. It should be understood that though the tread members 26 are shown in the section portion of FIG. 1 as being manufactured from rubber, they may be manufactured from any material such as a natural or synthetic rubber or plastic and may be formed together as a unitary or two piece pedal body member as disclosed in my copending application Ser. No. 150,036, filed June 4, 1971, entitled "Plastic Bicycle Pedal" and assigned to the assignee of the present invention.

The treads 26 are provided with the reflectors 50 to display a warning signal to motorists who are overtaking the cyclist or traveling in the opposite direction. The treads 26 have an exterior side surface 48 which is visible from the side of the pedal. The reflectors 50 mounted to the exterior side surfaces 48 of the treads 26 are visible to the motorists even when the cyclist's foot is on the pedal.

The reflector 50, as shown in FIG. 1, includes a reflector member 52 and a sealing member 54 which is sealed about the periphery of the reflector 52. This sealing member 54 prohibits foreign matter from contaminating the reflective facets 56 of the reflector 52 and thereby allows the reflector to maintain its reflective properties. The reflector 50 is retained in the pedal tread 26 by the frictional retaining means, generally indicated at 58 in FIG. 1. It should be understood that any conventional retaining means may be provided to hold the reflector 50 on the exterior side surface 48 of the pedal tread 26.

The end brace 20 is provided to coact with the tread supporting frame member 18 to provide the compressive forces necessary to hold the members of the pedal body 14 together as an integral structure as will be hereinafter more fully described. The end brace 20 is assembled to the frame member 18 by means of the openings 60 in the end brace 20 which receive the nibs 62 on the tread supporting portions 40 of the frame member 18 as will be hereinafter more fully described.

To provide for rotation of the pedal body 14 relative to the pedal axle 12, the ball bearings 24 are received in the groove 64 of the axle 12 and positioned therein by the ball cup 22 and the end brace 20. The cooperating surfaces of the bearings 24 and groove 64 comprise a portion of the bearing means 16 for rotatably supporting the pedal body 14 on the pedal axle 12. When the ball bearings 24 are positioned in the bearing groove 64, axial movement of the pedal body 14 is prohibited by the coaction of the ball bearings 24, ball cup 22 and end brace 20 which prohibit the bearings 24 from riding out of the groove 64.

The bearing 30 of the pedal body 14 is also provided to allow relative rotation of the pedal body 14 with respect to the pedal axle 12. The tube 28 acts as a spacer between the ball cup 22 and the bearing 30 and maintains their relative positions with respect to each other. The bearing 30 includes a tubular portion 66 adjacent to the tube 28, a compression portion 68 and an end portion 70. The tubular portion 66 has an outer surface 72 which is frictionally received by the tube 22. The compression portion 68 has a compression surface 74 which is in contact with the end of the tube 28 and another compression surface 76 which is in contact with the surface 77 retainer member 32. When in an assembled position the surfaces 76, 74 receive compression loadings from the respective members, retainer 32 and tube 28, that contact them as will be hereinafter described. These compression loadings hold the members of the pedal body 14 into an integral structure.

Figure 2:
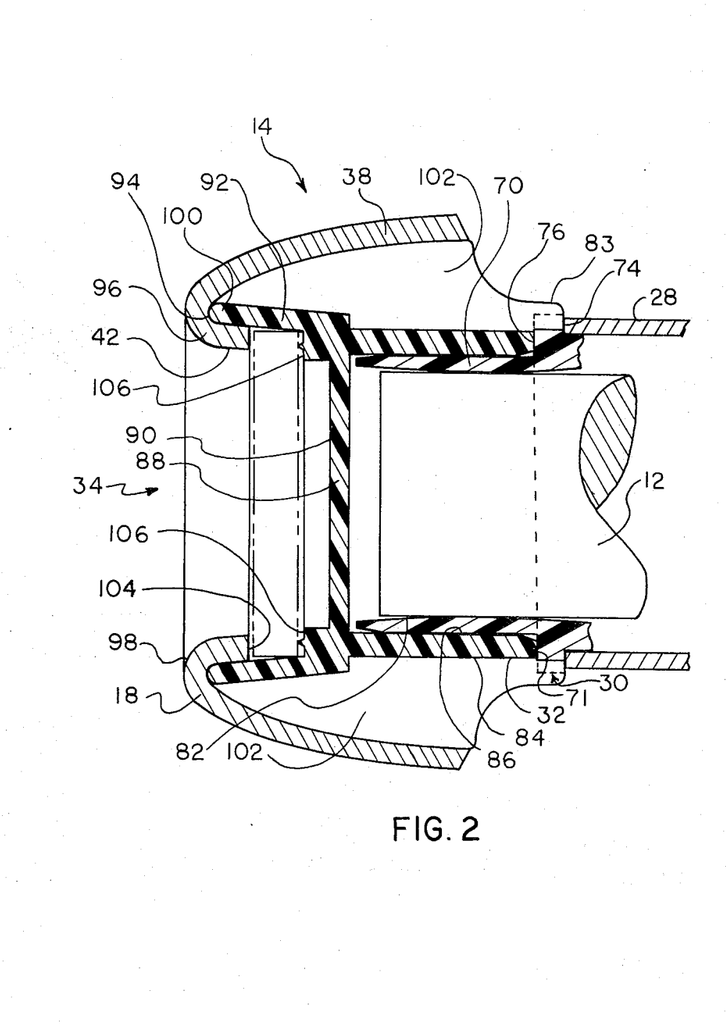
FIG. 2 is a fragmentary sectional view of the bicycle pedal shown in FIG. 1 and taken along lines 2—2 thereof.
Figure 3:
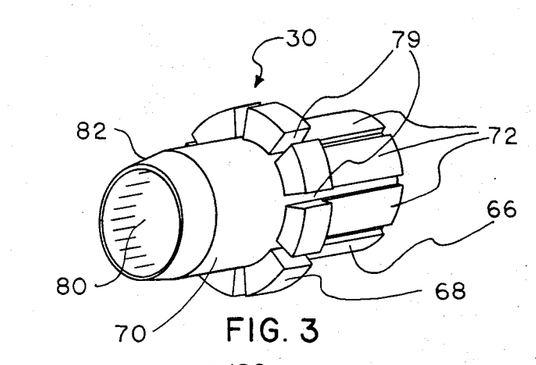
FIG. 3 is a perspective view of a bearing member utilized in the pedal shown in FIG. 1.
Figure 4:
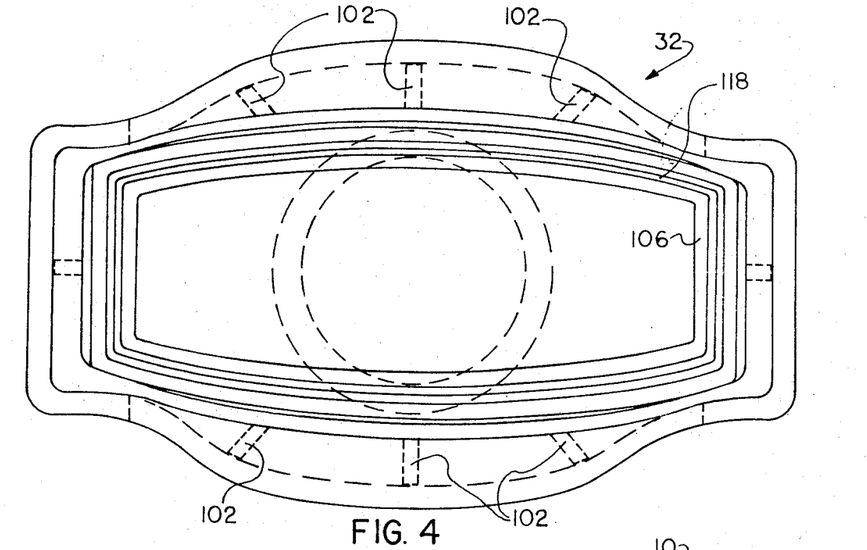
FIG. 4 is an end view of the bearing, and reflector retainer member utilized in the pedal shown in FIG. 1.

The bearing 30, as best seen in FIG. 3, has on the exterior surfaces of the tube portion 66 and compression portion 68 a number of splines 79 extending around these exterior surfaces. The splines 79 receive the tabs 83 of the reflector retainer member 32, as shown in FIGS. 1 and 2, when in an assembled position so as to lock the bearing 30 from rotation relative to the reflector retainer member.

Since the bearing 30 is manufactured by an injection molding process, the splines 79 also maintain a uniform cross section throughout the bearing member to thereby decrease the time required to manufacture these parts and provide a more accurate finish from the surfaces therof. The splines 79 also serve to decrease the cost of the bearing 30 since less material, such as nylon, which provides for free spinning characteristics of the pedal body with respect to the pedal axle.

The bearing member 30 has a bearing surface 78 which is part of the bearing means 16 and cooperates with a complimentary bearing surface 80 on the pedal axle 12. The bearing surface 78 has a curvilinear shape which is convex to the bearing surface 80 of the pedal axle 12. This curvilinear shape allows for self alignment of the axle 12 with respect to the bearing 30. The curvilinear shape also compensates for any misalignment that might exist. These complimentary bearing surfaces 78, 80 of the bearing means 16 thereby provide for free spinning of the pedal body 14 on the pedal axle 12.

The bearing member 30 also has an external chamfer 81 on the tube portion 66 which allows for easy assembly of the bearing 30 onto the tube 28. A chamfer 82, as best seen in FIG. 2, is also provided on the end portion 70 thereof to allow the retainer 32 to be easily assembled thereto.

The retainer member 32 of the pedal body 14 is positioned between the bearing member 30 and the outboard portion 38 of the frame member 18. The retainer member 32 acts to transmit a compressive force between the bearing member 30 and frame 18. The retainer 32 also seals the reflective surface of the reflector 34 from contamination thereof by foreign matter as will be hereinafter described. Such a seal maintains the reflective properties of the outboard reflector 32.

The retainer member 32, as shown in FIGS. 1 and 2, has a centrally located portion 84 having a cylcindrical surface 86 which terminates in an end wall portion 88. The end wall 88 defines the backing surface 90. The retainer member 32 also includes a compression portion 92 which extends from the centrally located portion 84 and has a surface 94 complimentary with and in communication with the outboard portion 38 of the frame member 14.

The retainer member 32 is manufactured from any material but in the preferred embodiment is shown as manufactured from a plastic and preferably a low cost plastic such as polyproplene. The purpose for the use of low cost material is basically one of economy which is inherent in the design of the pedal 10. While the retainer member 32 may be manufactured from a low cost plastic while the bearing member 30 is manufactured from a more expensive bearing material such as nylon. This construction therefore inherently decreases the material cost without impairing the operational properties of the bicycle pedal but rather enhances them. It should be understood that the bearing member 30 and the retainer 32 may be manufactured in a one piece construction, such as the one piece constructions which will be hereinafter shown in connection with the embodiments shown in FIG. 8 and 12.

The outboard end portion 38 of the frame member 18 is formed with an opening 42 therein through which the reflector 34 is visible. The opening 42 in the outboard end portion 38 of the frame member 14 is formed by rolling the outboard edges 96 inwardly so as to provide a smooth continuous surface 98 blending into the opening 42 and that unsafe edges having burrs and other rough edges are eliminated. The surface 94 of the compression portion 92 of the retainer member 32 is complimentary to the inside surface 100 of the outboard end portion 38 so as to provide suitable sealing between the frame member 14 and retainer member 32. These surfaces 94, 100 are continuous and have a substantially oval shape to provide for uniform contact between the frame member 14 and retainer member 32.

In order to protect the reflector 34, the outboard end portion 38 has an arcuate shape as generally indicated at 97 in FIG. 1 which increases the distance between the reflector 34 and the outer surface 98 of the outboard end portion 38. The outer surface 98 terminates at the edge surface 104 which extends about the outer peripheral portion of the outer surface 98 of the reflector 34. Thus, when the pedal is utilized on a bicycle, any member that comes into contact with the outboard end 36 of the pedal 10 contacts the surface 98 instead of exerting a force directly on the reflector 34 and thereby the construction minimizes the possibility of breakage and damage to the reflector. It should be understood that the frame member 18 is formed from metal or other high strength material to provide for increased strength and abrasion resistance thereof.

During assembly, the end brace 20, ball bearings 24, ball cup 22 and tube 28 are located in their respective positions shown in FIG. 1. The bearing member 30 is then slid over the outboard end of the pedal axle 12 and inside the tube 28 until the compression surface 74 contacts the complimentary surface on the tube 28.

The centrally located portion 84 of the retainer member 32 is then slid over the end portion 70 of the bearing 30 until the compression surface 71 of the centrally located portion 84 contacts the compression surface 76 of the bearing member 30. The reflector 34 is joined to the retainer member 32 in a manner as will be hereinafter described and is generally positioned to be visible from the outboard end 36 of the pedal 10. The treads 26 are positioned on the tread supporting portions 40 of the frame 18. The frame 18 is then positioned over the retainer member 32 and end brace 20 so that the nibs 62 are received in the openings 60 of the end brace 20 and the surface 94 of the retainer member 32 are in contact with the complimentary surfaces 100 of the outboard portion 38 of the frame 18.

A compressive force is then exerted between the outboard end portion 38 of the frame 18 and the end brace 20 until the members 14,20,22,24, 28,30,32 are frictionally forced into a unitary, integral pedal body. The nibs 62 are then crimped to maintain this compressive force and provide a pedal body 14 which is rotatable on the pedal axle 12. It should be understood that the fit of the ball bearings 24 and the race 64 of the pedal axle 12 prohibit axial movement of the pedal body 14 along on the pedal axle 12 while allowing rotation thereof.

Thus, it can be seen that the compression portion 68 of the bearing member 30 is placed in compression between the tube 28 and the retainer member 32 to thereby retain the bearing member 30 as an unitary, integral part of the pedal body 14.

In order to provide additional support for the compressive forces in the pedal body the member 32 has a plurality of radially extending ribs 102 which joint the centrally located portion 84 and the compression portion 92 so as to rigidedly connect those portions 84, 92.

The reflector 34 is positioned between a portion of the outboard end portion 38 of the frame member 18 and the retainer member 32 as seen in FIG. 1. The reflector is positioned in alignment with the opening 42 and is visible therethrough when the pedal 10 is viewed from the outboard end 36 thereof.

Preferably, a seal is effected between the retainer member 32 and the reflector 34 to provide for proper sealing of the reflector 34 from contamination of foreign The reflector 34 has an outboard surface 112 and an inboard surface 114. The inboard surface 114 has a plurality of reflective facets generally indicated at 116, which reflect light impinging on the reflector 34 in a manner well known to those skilled in the art. If these facets 116 are contaminated by foreign matter, such as water, dust, dirt, grease, oil, etc., the light will not properly be reflected by the facets 116. Complimentary sealing faces on the reflector 34 and retainer 32 provide for an effective seal between these members. The retainer member 32 has a continuous sealing face 106 which circumscribes the backing surface 90 and has a shape complimentary to a sealing face 108 on the reflector 34 so that the faces 106, 108 engage to provide a seal therebetween. These surfaces, preferable, are ultransonically welded to make the reflector 34 and retainer 32 an integral unit.

Figures 5, 6, 7:
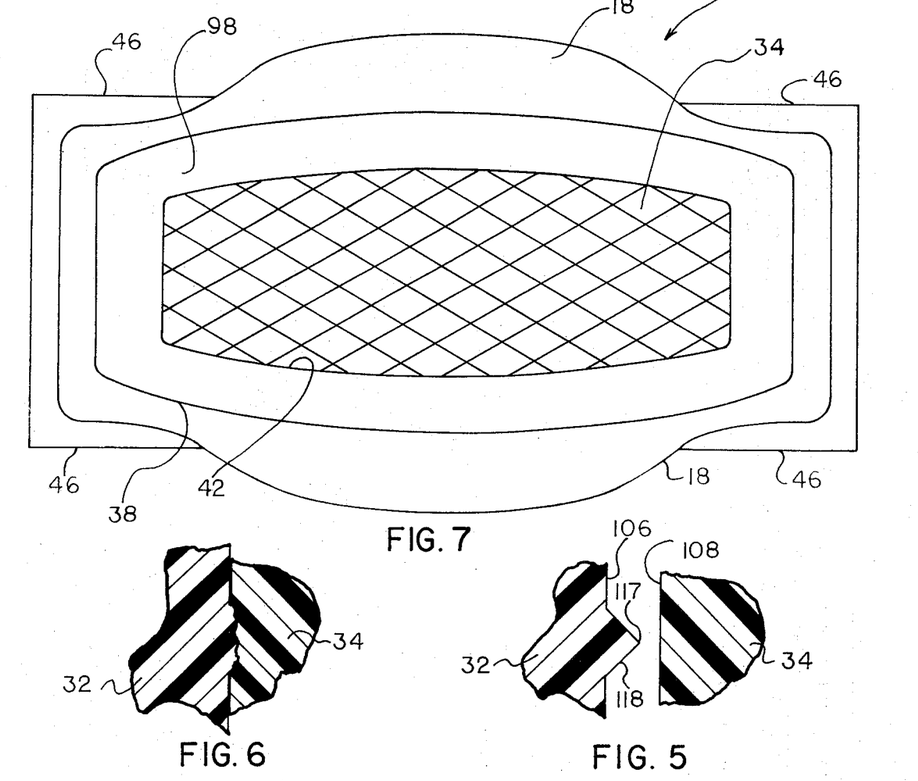
FIG. 5 is an enlarged fragmentary sectional view of the reflector and the bearing and reflector retainer incorporated in the pedal shown in FIG. 1 prior to assembly thereof.
FIG. 6 is an enlarged fragmentary sectional view of the reflector and the bearing and reflector retainer member incorporated in the pedal shown in FIG. 1 after assembly thereof.
FIG. 7 is an end view of the pedal shown in FIG. 1.

To facilite ultransonically joining the reflector 34 and the retainer 32, the surface 106 has an extending portion 118 as shown in cross section in FIG. 5. The extending portion 118 extends continuously around the sealing face 106 so as to prevent contaminants from comming into contact with the facets 116 after asembly of the reflector 34 to the retainer member 32. The reflector 34 is positioned so that the sealing face 108 of the reflector 34 is adjacent to the outer edge 117 of the extension 118 as shown in FIG. 5. The reflector 34 is then moved into a position so that the surface 108 contacts the outer edge 117 of the extension 118 on the surface 106 whereupon the parts 32, 34 are ultransonically welded, as shown in fragmentary section in FIG. 6.

This sealing method provides a hermetic seal which prohibits foreign matter from contaminating the reflective facets 116 on the inboard side 114 of the reflector 34. It should be understood that any other method of providing a seal between the reflector 34 and the retainer 32 such as heat, solvents or adhesives may be utilized to provide a hermetic seal. Since the backing surface 90 extends between the continuous sealing surface 106, contaminants and foreign matter cannot come into contact with the reflective facets 116 of the pedal reflector 34.

Any suitable technique may be used to maintain the reflective properties of the reflector 34. For example, another pedal body member such as a foil backing member may be used to back the reflective facets 116 in order to maintain the reflective properties thereof. The foil backing member material may be formed from plastic or metalic material which is capable of being joined to the reflector to provide a hermetic seal therebetween. It should be understood that such a foil backing member would serve to provide a seal for the reflective facets 116 but would not contact the facets.

While the above embodiment provides for securing the reflector 34 and retainer 32 together as a unit and then positioning that unit between the end brace 38 and bearing 30, the reflector 34 may be supported between the end brace 38 and a part of the pedal body 14 other than the retainer 32. Moreovoer, the reflector 34 may be secured to a member of the pedal body other than the retainer as long as the reflector is properly supported in accordance with the present invention.

It should be apparent from the above that the reflector 34 is positioned between the frame member 18 and the retainer member 32 and is protected by the outer edge by the outboard portion 38 of the frame member 18, as seen in FIG. 7. The reflector 34 which is visible from the outboard end 36 of the pedal 10 and renders the bicycle pedal 10 luminous so that a clear indication of a cyclist's presence on a bicycle having such pedals will be apparent to approaching motorists. When a motorist approaches a cyclist who is in motion utilizing the pedals of the immediate invention, his headlights will strike the reflector 34 and a flashing reflective signal will be produced due to the motion of the pedals. It should be understood that the color of the reflector 34 will act enhance the warning nature of the flashing signal and may be of any number of colors, such as amber or red.

It should also be apparent that the reflectors 50 mounted on the sides 48 of the pedal will provide further safety features of the bicycle pedal 10 when the motorist is traveling in the same direction or opposite direction as the cyclist. It is important to understand that the motion of the pedal does create a flashing type of signal which attracts the motorist's attention more readily than a fixed reflector.

Figure 8:
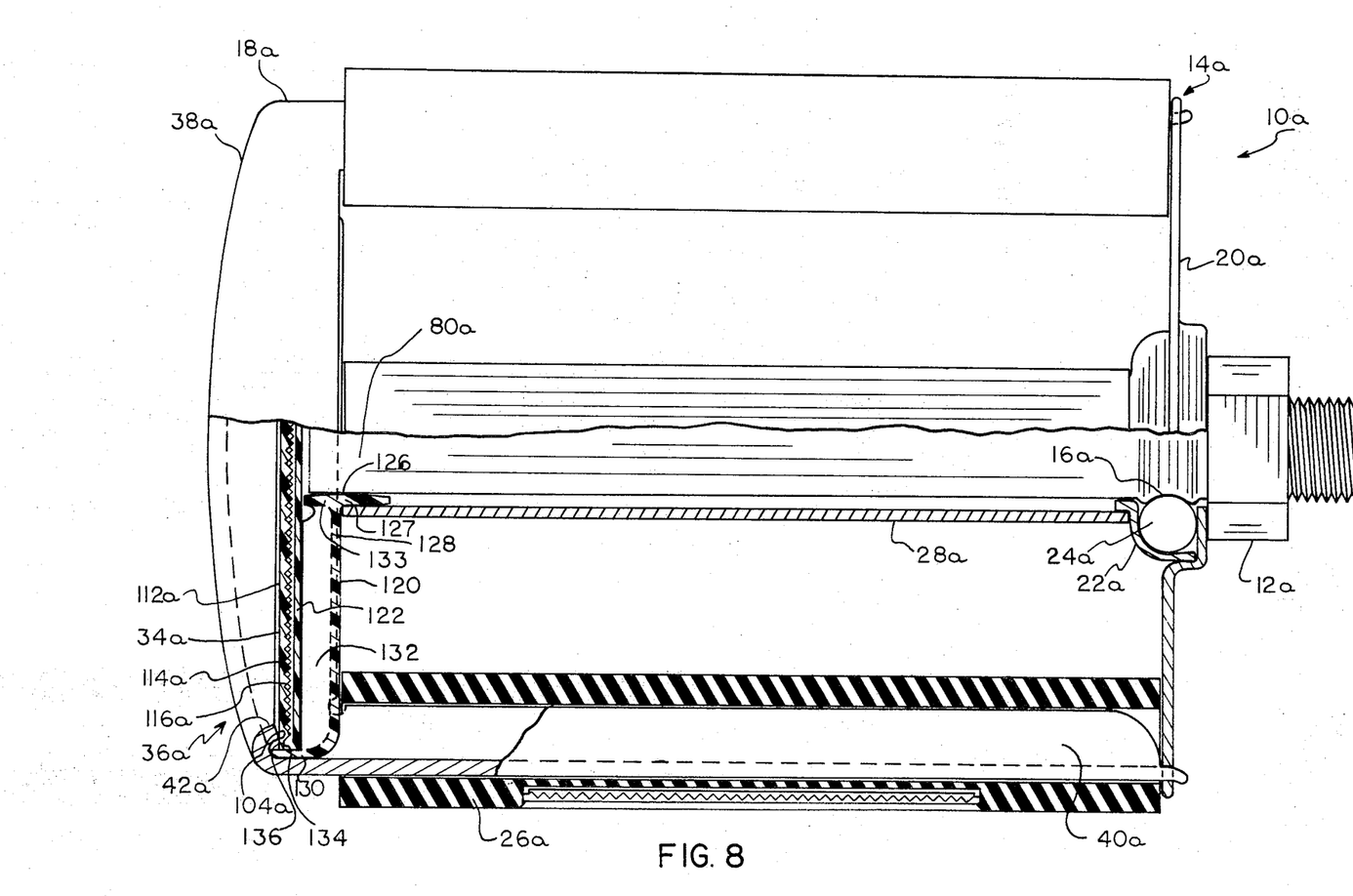
FIG. 8 is a side elevational view of another pedal similar to that shown in FIG. 1, but of a modified construction.
Figure 9:
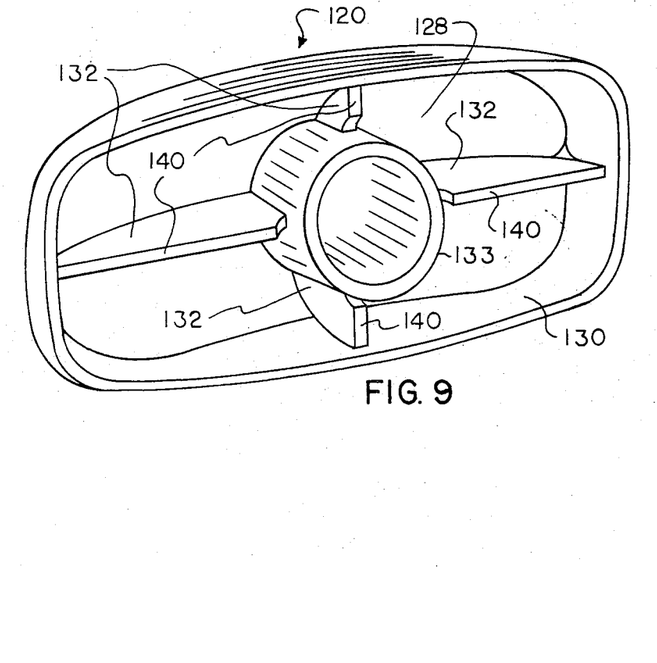
FIG. 9 is a perspective view of the bearing and reflector retainer member incorporated in the construction of the pedal shown in FIG. 8.
Figure 10:
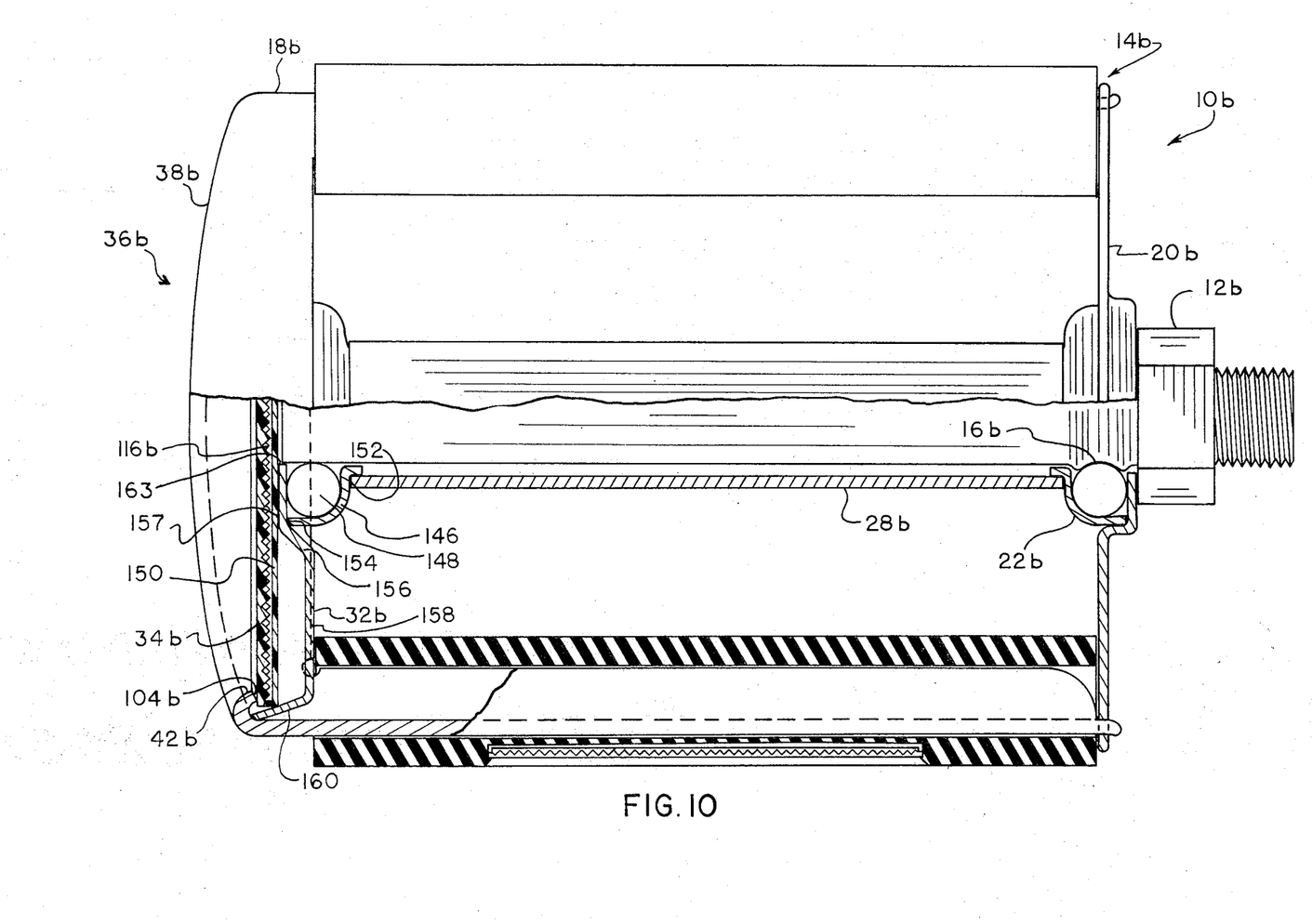
FIG. 10 is a side elevational view of another pedal similar to the pedal shown in FIG. 1, but of a modified construction.

The specific pedal body construction shown in FIG. 1–7 should be considered as primarily illustrative. Other constructions are illustrated in FIGS. 8–10. For ease of description these other constructions are numbered with numerals the same as those used in FIG. 1 to denote common parts where appropriate and followed by a suffix letter to denote each specific embodiment. For example, the common parts of the construction shown in FIGS. 8 and 9 will be followed by the suffix "a," the common parts of the construction shown in FIG. 10 by the suffix "b," the common parts of the construction shown in FIG. 11 by the suffix "c," and the common parts of the construction shown in FIG. 12 by the suffix "d."

In FIGS. 8 and 9, the illustrated embodiment of a reflectorized bicycle pedal 10a includes a pedal body 14a and bearing means 16a for rotatably mounting the pedal body 14a to the pedal axle 12a. The pedal body includes a frame member 18a, an end brace 20a, ball bearings 24a, ball cup 22a, tube 28a, a reflector retainer and bearing member 120, a sealed reflector 34a, and a sealing member 122 for sealing the reflector.

The reflector retainer and bearing member 120 serves the dual functions of acting as a bearing member and also a member to retain the reflector 34a in the pedal body 14a. The member 120 has a curvilinear bearing portion 126 extending along a portion of the pedal axle 12. A portion 127 of the bearing portion 126 is received inside of the tube 28a which abuts against a radially extending portion 128 of the member 120. The radially extending portion 128 terminates in an axially extending portion 130 which extends towards the outboard end 36a of the pedal body.

The bearing portion 126 has an outboard portion 133 which extends axially from the radial portion 128 towards the outboard end 36a of the pedal body 14a. To provide for reinforcement of the member 120 and also act as backing surfaces for the reflector 34a, a plurality of gussets 132 are provided between the outboard portion 133 and the axially extending portion 130 of the member 120.

The reflector 34a has an outboard surface 112a and an inboard surface 114a which has a number of reflective facets 116a thereon. The sealing member 122 has a sealing face 134 having a shape which is complimentary to the shape of the sealing face 136 of the reflector 34a. These continuous sealing faces 134, 136 are sealed with respect to each other to provide a hermetic seal so that the facets 116a of the reflector 34a are not contaminated with foreign matter to thereby impair the reflective properties of the reflector 34a. It should be understood that the sealing member 122 may be of any material or design, such as foil as hereinabove described, which will affect sealing of the reflective facets 116a from contamination thereof.

To secure the reflector 34a to the pedal body 14a, the reflector is positioned between the edge surface 104a of the outboard portion 38a of the frame member 18a and the reflector retainer and bearing member 120. The ribs 132 on the reflector retainer and bearing member 120 have surface portions 140 thereon which are positioned to contact the rear face 142 of the reflector sealing member 122.

When a compressive force is exerted between the frame 18a and the end brace member 20a, as described in connection hereinabove with the embodiment shown in FIG. 1, the compressive force clamps the reflector 34 between the edge surface 104a and the members 122 and 120 to secure the reflector to the pedal body 14a as an integral part thereof.

The member 120 is designed so that a portion of the compressive force is transmitted through the reflector 34a and the remainder of the compressive force is transmitted through the axially extending portion 130 of the member 120. More particularly, a portion of the compressive force is exerted through the surface 104a of the outboard end of portion 38a of the pedal frame member 18a to the reflector 34a and sequentially through the member 122 to the reflector retainer and bearing member 120, to the tube 28a, to the ball cup 22a and back to the end brace 20a. The other portion of the compressive force is transmitted directly from the outboard portion 18a of the frame 18a to the axially extending portion 130 of the bearing member 120. By so splitting the compressive forces, any impact forces exerted on the outboard end of the pedal 10a will be transmitted through frame 18a and the axial portion 130. The gussets 132 may be designed so as to flex and act as a spring so that the compressive force acting on the reflector 34a remains substantially constant regardless of impact loadings.

Thus, it is apparent from the above that the compressive forces existing in the assembly of the pedal 10a place the reflector 34a in compression between the members 18a and 120 so that the reflector 34 becomes an integral part thereof and is positioned so that the reflector is visible through the opening 42a in the end portion 38a of the frame members 18a. By so positioning reflector 34 in compression between two members of the pedal body, a practical, yet inexpensive, technique is provided for securing the reflector to the outboard end of a bicycle pedal 10a. Furthermore, the outboard end portion 38a provides protection for the reflector 34a from impact and side loading forces.

It should be understood that it is within the comtemplation of this invention to provide a sealing surface on the member 120 which is continuous with the sealing surface 134 on the reflector 34a upon which the reflector 34a may be sealed and receive the compressive loading forces from the frame member 18a through the axially extending portion 130 of the member 120 while maintaining the reflector 34a in alignment with the opening 42a in the outboard end portion 38a. It should also be understood that by forming a sealing portion extending between the outboard portions 133 and across the outboard end to the axle 12a, the reflector 34a may be sealed by the member 120 to thereby eliminate the necessity for the sealing member 122. It should also be understood that the reflector may be secured to the pedal 10a by other pedal body members than hereinabove described.

The third embodiment of the bicycle pedal 10b of the present invention is shown in FIG. 10. The pedal 10b includes a pedal body 14b rotatably supported on a pedal axle 12b by bearing means 16b.

The pedal body 14b includes a frame member 18b, end brace member 20b, ball cup member 22b, ball bearing members 24b and 148, tube member 28b, ball cup member 146, reflector retainer and bearing member 32b, a reflector member 34b and a backing member 150 secured to the reflector 34b. The ball cup 146 has a tube receiving portion 152 which receives the outboard end of the tube 28b in abutting relationship therewith.

The bearing means 16b is provided to allow rotation of the pedal body 14a with respect to the pedal axle 12a. The ball bearings 148 are received in the ball cup 146 and are retained therein by means of the reflector retainer and bearing member 32b. The ball bearings 148 have surfaces which contact a complimentary surface portion of the pedal axle 12b to form a portion of the bearing means 16b. The other portion of the bearing means 16b is defined by the surface portions of the ball bearings 24b and the bearing race 64b of the pedal axle 12b.

The ball cup 146 has a surface 154 in contact with and "nesting" in the depressed central portion 156 of the reflector retainer and bearing member 32b.

The reflector retainer and bearing member 32b has a portion 158 which extends from the central portion 156 in an outwardly radial direction to an axial portion 160. The axial portion 160 extends from the portion 158 in an axial direction towards the outboard end 36b of the pedal body 14b until it is in contact with the frame member 18b.

The reflector 34b is secured to the backing member 150 as described hereinabove in connection with the embodiment shown in FIGS. 8 and 9. The reflector 34b is positioned between the outboard portion 38b of the frame member 18b and the central portion 156 of the member 32b.

As described in connection with the pedals 10 and 10a, compressive forces exist between the frame member and the bearing and reflector retainer member when a bicycle pedal of the present invention is assembled. A portion of the compressive forces existing between the end brace 20b and the frame member 18b are transmitted from the surface 104b to the reflector 34b and sequentially to the sealing back plate 150 and to the outboard surface 157 of the central portion 156 of the member 32b. The member 32b also receives some compressive force from the strap 18b through the axially extending portion 160. This compressive force is transmitted through the radial portion 158 to the central portion 156 of the member 32b. The compressive force is transmitted from the central portion 156 to the ball cup 146, through the tube 28b to the ball cup 22b and to the end brace 20b.

The reflector 34b is maintained in alignment with the opening 42b in the outboard portion 38b of the frame 18b by the compressive load exerted thereon. The amount of compressive force carried by the reflector 34b is merely sufficient to retain the reflector in position without incurring such forces which would damage the reflector as herein described in connection with the pedal 10a.

It should be also understood that it is within the scope of this embodiment to provide the reflector member 34b with a sealing surface adapted to seal the reflector 34b to the member 32b. The central portion 156 may be formed to extend across the opening 163 in which the axle 12b is located to provide a back sealing surface to prohibit contaminating foreign matter from impairing the reflective properties of the facets 116b of the reflector 34b.

Figure 11:
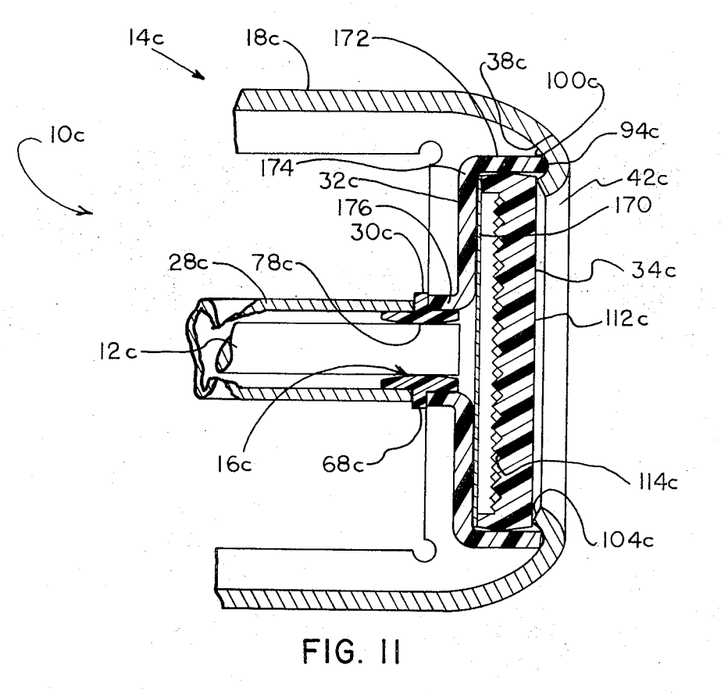
FIG. 11 is an enlarged sectional view of a portion of another pedal similar to the pedal shown in FIG. 1, but of a modified construction

Yet another embodiment of the present invention is shown as the pedal 10c in FIG. 11. For purposes of simplification, only a portion of the pedal 10c is shown. It should be understood that the portions of the pedal 10c not shown in FIG. 11 are of the same design as shown in FIGS. 1-7.

The pedal 10c includes a tread supporting frame member 18c having an outboard end portion 38c. The retainer member 32c has an axially extending portion 172 which contacts the outboard end portion 32c of the frame member 18c. The retainer has a radial portion 174 extending radially inwardly toward the axle 12c of the pedal body 14c. The radial portion 174b terminates in a bearing receiving portion 176.

The bearing 30c has a portion 68c which is in compression between the retainer member 32c and the tube 28c of the pedal body 14c. This compressive force secures the bearing member 30c to the tube 28c and retainer member 32c so that the bearing member is a part of the pedal body 14c. The bearing 30c also has a curvilinear bearing surface 78c which bears on a portion of the outboard surface of the axle 12c to provide a part of the bearing means 16c.

The pedal body 14c also includes a reflector 34c and a foil sealing member 170. The sealing member 170 hermetically seals the reflector 34c from exposure of the reflector to foreign matter as hereinabove described.

The reflector 34c is held in alignment with the opening 42c in the outboard portion 38c of the frame member 18c by compressive forces. The surface 104c contacts the outboard surface 112c of the reflector 34c and exerts a compressive force thereon. This compressive force is transmitted through the reflector 34c to the inboard surface 114c thereof and is tramsitted through the sealing member 170, the retainer member 32c, bearing 30c and tube 28c sequentially as hereinabove described in connection with other embodiments of the present invention.

The amount of the compressive force carried by the reflector 34c is merely sufficient to retain the reflector in position.

As described in connection with the pedals 10, 10a, and 10b, compressive forces exist between the frame member 18c and the reflector retainer member 32c when a bicycle pedal 10c of the present invention is assembled. A portion of the compressive forces existing between the end brace and the frame member 18c are transmitted from the surface 104c to the reflector 34c and sequentially to the foil sealing member 170 to the member 32c. The member 32c also receives some compressive force from the strap 18c through the axially extending portion 172. This compressive force is transmitted through the radial portion 174 to the bearing receiving portion 176 of the member 32c. The compressive force is transmitted from the bearing receiving portion 176 of the bearing 30c, through the tube 28c to the ball cup and to the end brace of the pedal 10c.

The reflector 34c is maintained in alignment with the opening 42c in the outboard portion 38c of the frame 18c by the compressive load exerted thereon. The amount of compressive force carried by the reflector 34c is merely sufficient to retain the reflector in position without incurring such forces which would damage the reflector as herein described in connection with the pedal 10a.

Figure 12:
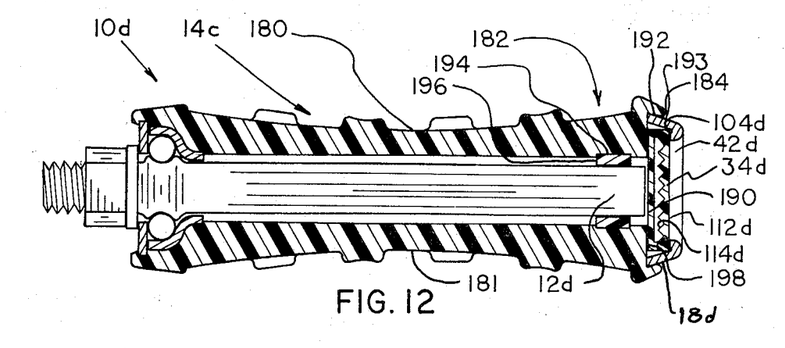
FIG. 12 is a sectional view of another pedal similar to the pedal shown in FIG. 1, but of a modified construction.

Another embodiment of the present invention is shown as the pedal 10d in FIG. 12. The pedal 10d has an upper and a lower pedal body tread member 180, 181 respectively, as disclosed in my copending Application Ser. No. 150,036, filed June 4, 1971 entitled "Plastic Bicycle Pedal," and assigned to the assignee of the present invention. The tread members 180, 181 are manufactured from any material such as natural or synthetic rubber or plastic and are joined together as a unitary body 182.

The unitary body 182 has a recess 194 which receives a bearing 196 therein. The bearing 196 provides for rotation of the pedal body 14d about the axle 12d.

The pedal body 14d includes a reflector 34d visible from the outboard end of the pedal body 14d. The unitary body 182 has a recess 184 in the outboard end thereof. The reflector 34d is positioned in the recess 184 with a sealing member 190 secured to the peripheral surface of the inboard surface 114 of the reflector 34d. The sealing member 190 hermetically seals the reflective facets of the inboard surface 14d of reflector 34d from contaminants.

The reflector 34d is retained in position in the outboard end of the pedal 10d by a compressive force between the unitary body 182 and the frame member 18d. The frame member 18d has an opening 42d through which the reflector 34d is visible.

The compressive force to retain the reflector 34d in alignment with the opening 42d is created by positioning the frame member 18d in the recess 184. The peripheral side surface 192 which defines a portion of the recess is formed at an angle while the outer peripheral surface 193 of the frame member 18d is formed at a complimentary angle as shown in FIG. 12. This angular relationship between the peripheral surfaces 192, 193 and the natural resiliency of the material from which the tread members 180, 181 are made, forces the frame member 18d against the reflector 34d.

This compressive force is transmitted through the reflector 34d, and the sealing member 190. If excessive exterior forces are exerted on the frame member 18d, the frame member will contact the backing surface 198 of the unitary body 182 to thereby eliminate damage to the reflector 34. The sealing member 190 is also seated against the surface 198 and receives the compressive force exerted thereon.

The frame member 18d extends outboard of the outboard surface 112d of the reflector 34d to protect the reflector 34d from damage thereto as hereinabove described.

It is apparent that all of the embodiments of a pedal of the present invention described hereinabove incorporate the common features of securing a reflector to a pedal body member behind an opening in the outboard portion of the pedal frame and sealing the reflector against that pedal body member. By positioning the reflector behind the frame, the reflector is protected from damage thereto. Sealing the reflector prevents exposure of the reflective facets of the reflector from contamination by foreign matter.

I claim:

1. A reflectorized bicycle pedal comprising a pedal axle, a pedal body, bearing means supporting said pedal body for rotation relative to said pedal axle, said pedal body comprising a frame member having an outboard end portion defining a portion of the outboard end of said pedal body, said outboard end portion of said frame member having means defining an opening therein, said pedal body further including a reflector having inboard and outboard surfaces with a continuous sealing face circumscribing at least one of said surfaces, and means supporting said reflector in alignment with said opening in said frame so that said outboard surface of said reflector is visible from the outboard end of said pedal, said supporting means including at least one pedal body member having a continuous sealing face disposed in abutting engagement with said continuous sealing face of said reflector, said one pedal body member circumscribing said inboard surface of said reflector and having a backing surface extending between said sealing face of said one pedal body member and completely enclosing said inboard surface of said reflector to prevent exposure of said inboard surface of said reflector to foreign matter.

2. A reflectorized bicycle pedal as defined in claim 1 wherein said outboard portion of said frame member extends outwardly of said outboard surface of said reflector to protect said reflector from damage thereto.

3. A reflectorized bicycle pedal as defined in claim 1 wherein said opening in said outboard end portion extends through said frame member, said reflector positioned inboard of said outboard end portion of and aligned with said opening therein.

4. A reflectorized bicycle pedal as defined in claim 1 wherein said inboard surface includes a plurality of reflective facets for reflecting light impinging on the outboard surface of said reflector, said reflective facets being completely enclosed by said backing surface to prevent exposure of said reflective facets to foreign matter.

5. A reflectorized bicycle pedal as defined in claim 1 wherein said reflector is positioned between said one pedal body member and another of said pedal body members, said pedal body including means for exerting compressive forces between said one and said other pedal body members to retain said reflector therebetween.

6. A reflectorized bicycle pedal as defined in claim 1 wherein said supporting means includes means for sealing said continuous sealing face of said reflector to said continuous sealing face of said one pedal body member to support said reflector in alignment with said opening in said frame member and to prevent exposure of said inboard surface of said reflector to foreign matter.

7. A reflectorized bicycle pedal as defined in claim 1 wherein said one pedal body member of said reflector supporting means includes a first compression surface in communication with said outboard end portion of said frame member and second compression surface in communication with another pedal body member, said one pedal body member retained as an integral part of said pedal body by compressive forces exerted between said first and second compression surfaces, and positioned to receive impact forces exerted on said outboard end portion of said frame member.

8. A reflectorized bicycle pedal comprising a pedal axle, a pedal body, bearing means supporting said pedal body for rotation relative to said pedal axle, said pedal body including a plurality of members at least one of which is a tread-supporting frame member, said tread-supporting frame member including a pair of spaced tread-supporting portions and an outboard end portion extending between and interconnecting said tread-supporting portions and defining a portion of the outboard end of said pedal body, said outboard end portion of said tread-supporting frame member having means defining an opening therein, said pedal body further including at least one tread member engaging and supported by said spaced tread-supporting portions, a reflector forming a part of said pedal body, means supporting said reflector in alignment with said opening in said outboard end portion so that said reflector is visible from the outboard end of said pedal, said supporting means including at least two of said members disposed to exert compressive forces on opposite side surfaces of said reflector to securely retain said reflector against movement relative to said pedal body, said opening in said outboard end portion extending through said frame member, said reflector positioned inboard of said outboard portion of and aligned with said opening therein, and means for hermetically sealing said reflector.

9. A reflectorized bicycle pedal comprising a pedal axle, a pedal body, bearing means supporting said pedal body for rotation relative to said pedal axle, said pedal body including a plurality of members at least one of which is a tread-supporting frame member, said tread-supporting frame member including a pair of spaced tread-supporting portions and an outboard end portion extending between and interconnecting said tread-supporting portions and defining a portion of the outboard end of said pedal body, said outboard end portion of said tread-supporting frame member having means defining an opening therein, said pedal body further including at least one tread member engaging and supported by said spaced tread-supporting portions, a reflector forming a part of said pedal body, and means supporting said reflector in alignment with said opening in said outboard end portion so that said reflector is visible from the outboard end of said pedal, said supporting means including at least two of said members disposed to exert compressive forces on opposite side surfaces of said reflector to securely retain said reflector against movement relative to said pedal body, one of said side surfaces of said reflector having a sealing face, one of said two pedal body members having a sealing face disposed in abutting engagement with said sealing face of said reflector and a backing surface extending between said sealing face of said one pedal body member and completely enclosing said one surface of said reflector to prevent exposure of said one surface of said reflector to foreign matter.

10. A reflectorized bicycle pedal comprising a pedal axle, a pedal body, bearing means supporting said pedal body for rotation relative to said pedal axle, said pedal body including a plurality of members at least one of which is a tread-supporting frame member, said tread-supporting frame member including a pair of spaced tread-supporting portions and an outboard end portion extending between and interconnecting said tread-supporting portions and defining a portion of the outboard end of said pedal body, said pedal body further including at least one tread member engaging and supported by said spaced tread-supporting portion, said outboard end portion having means defining an opening therein, a reflector forming a part of said pedal body, and means supporting said reflector in alignment with said opening in said outboard end portion so that said reflector is visible from the outboard end of said pedal, said outboard portion of said frame member extending outwardly of the outboard surface of said reflector to protect said reflector from damage thereto, said reflector having opposite side surfaces, one of said side surfaces of said reflector having a sealing face, one of said two pedal body members having a sealing face disposed in abutting engagement with said sealing face of said reflector and a backing surface extending between said sealing face of said one pedal body member and completely enclosing said one surface of said reflector to prevent exposure of said one surface of said reflector to foreign matter.

11. A reflectorized bicycle pedal comprising a pedal axle, a pedal body, bearing means supporting said pedal body for rotation relative to said pedal axle, said pedal body further including at least one tread member supported by said bearing means, a reflector forming a part of said pedal body and located in an opening in the outboard end thereof, and a cap-like member having portions which snap into the opening containing the reflector for holding the reflector therein.

12. A reflectorized bicycle pedal comprising a pedal axle, a pedal body, bearing means supporting said pedal body for rotation relative to said pedal axle, said pedal body including a plurality of members at least one of which is a tread-supporting frame member, said tread-supporting frame member including a pair of spaced tread-supporting portions and an outboard end portion extending between and interconnecting said tread-supporting portions and defining a portion of the outboard end of said pedal body, said outboard end portion of said tread-supporting frame member having means defining an opening therein, said pedal body further including at least one tread member engaging and supported by said spaced tread-supporting portions, a reflector retainer supported by said pedal axle and having means for retaining a reflector therein, a reflector forming a part of said pedal body and retained in said reflector retainer, and means supporting said reflector retainer in alignment with said opening in said outboard end portion so that said reflector is visible from the outboard end of said pedal.

* * * * *